3,236,899
TREATMENT OF 2,2,4,4-TETRAALKYL-1,3-CYCLOBUTANEDIOLS
Raymond D. Clark, Kingsport, Tenn., assignor to Eastman Kodak Company, Rochester, N.Y., a corporation of New Jersey
No Drawing. Filed Feb. 23, 1961, Ser. No. 90,935
5 Claims. (Cl. 260—601)

This invention relates to the cleavage of trans-2,2,4,4-tetraalkyl-1,3-cyclobutanediols, and more particularly to the cleavage of trans-2,2,4,4-tetraalkyl-1,3-cyclobutanediols to the corresponding 2,2,4,4-tetraalkyl-3-butenals under reaction conditions which do not affect the isomeric cis-2,2,4,4-tetraalkyl-1,3-cyclobutanediols.

The preparation of 2,2,4,4-tetraalkyl-1,3-cyclobutanediols has been described by Hasek and Elam in U.S. Patent No. 2,936,324. These diols have either a cis or trans configuration with respect to the hydroxyl groups. If all the alkyl groups are identical there are only two isomers, cis and trans, which can be represented as follows:

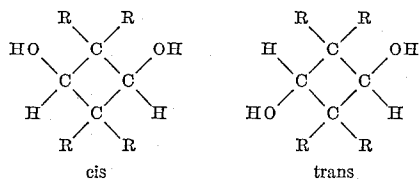

Additional isomers are possible if the alkyl groups are not identical. Thus, there are five possible isomers of 2,4-diethyl-2,4-dimethyl-1,3-cyclobutanediol, three of the isomers having a cis glycol configuration and two having the trans configuration. The above assignment of glycol configuration is based on spectral evidence, and in the case of 2,2,4,4-tetramethyl-1,3-cyclobutanediol, the cis structure is associated with the higher melting isomer.

Where reference is made herein to the cis isomer of a 2,2,4,4-tetraalkyl-1,3-cyclobutanediol, I refer to the structure which has the same configuration of hydroxyl groups as that of the higher-melting isomer of 2,2,4,4-tetramethyl-1,3-cyclobutanediol. Likewise, in referring to the trans isomer of a 2,2,4,4-tetraalkyl-1,3-cyclobutanediol I refer to compounds having the same configuration of hydroxyl groups as the lower-melting isomer of 2,2,4,4-tetramethyl-1,3-cyclobutanediol. The terms "cis" and "trans" are used herein to define the relationship of the hydroxyl groups without regard to differences in the alkyl groups. The cis and trans relationship of the alkyl groups to each other in the diols in which they are not all the same is affected only superficially, if at all, by the method of the present invention.

Acid catalyzed cleavage of certain acyclic and cyclic diols has been reported in the literature. Thus, H. H. Wasserman (Steric Effects in Organic Chemistry, M. S. Newman, ed., J. Wiley and Sons, Inc., New York, N.Y., 1956, p. 375) reported the acid catalyzed dehydration of certain 1,3-diols to olefinic and carbonyl moieties. English and Brutcher (J. Am. Chem. Soc., vol. 74, p. 4279, 1952) reported an insignificant degree of acid catalyzed cleavage of one type of cyclic glycol while Brutcher and Cenci (J. Org. Chem., vol. 21, p. 1543, 1956) reported extensive cleavage of another cyclic glycol. However, to the best of my knowledge no previous reports have been made of the differences that I have discovered in the behavior of cis and trans isomers of cyclic glycols under conditions conducive to acid catalyzed cleavage.

The present invention is based on my discovery that the cis and trans isomers of 2,2,4,4-tetraalkyl-1,3-cyclobutanediols exhibit pronounced differences in susceptibility to acid catalyzed cleavage. As a result of this discovery I have now developed a novel method of separating the cis isomer from a mixture of cis and trans isomers and a novel method of producing 2,2,4,4-tetraalkyl-3-butenals by dehydration of the trans isomers of the 2,2,4,4-tetraalkyl-1,3-cyclobutanediols.

Accordingly, one object of this invention is to provide a method for cleaving trans-2,2,4,4-tetraalkyl-1,3-cyclobutanediols to the corresponding 2,2,4,4-tetraalkyl-3-butenals. Another object is to provide a method for recovering cis-2,2,4-4-tetraalkyl-1,3-cyclobutanediols from a mixture comprising cis-2,2,4,4-tetraalkyl-1,3-cyclobutanediols and trans-2,2,4,4-tetraalkyl - 1,3-cyclobutanediols. Still other objects will be apparent to those skilled in the art from the following disclosure.

These and other objects of the invention are accomplished by reacting a trans-2,2,4,4-tetraalkyl-1,3-cyclobutanediol with an acid solution. I have found that heating in acid solution causes cleavage of trans-2,2,4,4-tetraalkyl-1,3-cyclobutanediols to the corresponding 2,2,4,4-tetraalkyl-3-butenals but does not affect the cis-2,2,4,4-tetraalkyl-1,3-cyclobutanediols.

This invention may be advantageously carried out by heating in a dilute aqueous solution of a strong mineral acid a mixture of cis and trans isomers of a 2,2,4,4-tetraalkyl-1,3-cyclobutanediol wherein the alkyl substituents are identical or different lower alkyl radicals having 1 to 4 carbon atoms. The trans-2,2,4,4-tetraalkyl-1,3-cyclobutanediol is dehydrated to the corresponding 2,2,4,4-tetraalkyl-3-butenal, which may be conveniently removed from the reaction zone by steam distillation using a continuous azetotrope separator. Normally, part of the cis-2,2,4,4-tetraalkyl - 1,3-cyclobutanediol crystallizes from the reaction solution. Additional cis-2,2,4,4-tetraalkyl-1,3-cyclobutanediol may be precipitated by making the reaction solution slightly basic. The cis glycol preferably is then purified, for example, by treating with sodium bicarbonate to remove traces of acid and recrystallizing the product from toluene.

The examples that follow illustrate specific embodiments of the invention. The first example demonstrates recovering from a mixture of cis and trans-2,2,4,4-tetramethyl-1,3-cyclobutanediol the purified cis isomer of the diol and the product 2,2,4-trimethyl-3-pentenal.

*Example 1*

A solution of 100 ml. of concentrated sulfuric acid (sp. gr. 1.84) in 2500 ml. of water was mixed with 1000 g. (6.94 moles) of 2,2,4,4-tetramethyl-1,3-cyclobutanediol (a mixture of approximately equal amounts of cis and trans isomers). The mixture was heated to boiling and the vapors were distilled into a continuous azeotrope separator. The solid glycol dissolved and the reaction mixture became homogeneous; as the reaction progressed, a crystalline solid gradually was deposited from the solution. The solid was cis-2,2,4,4-tetramethyl-1,3-cyclobutanediol, which is less soluble in water than the mixture of isomers. The reaction mixture was heated until volatile organic material no longer evolved and collected in the azeotrope separator. After 72 hours the amount of organic distillate was 427 g.

The residue, a mixture of solid and liquid, was cooled to room temperature and the solid was removed and dried. The yield of cis-2,2,4,4-tetramethyl-1,3-cyclobutanediol, M.P. 158–163° C., was 457 g. An additional 42 g. of cis-2,2,4,4-tetramethyl-1,3-cyclobutanediol, M.P. 162–163° C., was obtained by making the filtrate slightly basic with sodium bicarbonate and then removing and drying the precipitate. The total yield of cis-2,2,4,4-tetramethyl-1,3-cyclobutanediol was 499 g. (100% based on an estimated content of 50% of the cis isomer in the starting material).

The cis-2,2,4,4-tetramethyl-1,3-cyclobutanediol was dissolved in boiling toluene containing some solid sodium bicarbonate (to neutralize traces of occluded acid). Undissolved material was removed by filtration and the solution was cooled and allowed to stand. The recrystallized glycol (95% of the crude product) had a melting point of 162.5–163.5° C., identical with that reported for pure cis-2,2,4,4-tetramethyl-1,3-cyclobutanediol by James C. Martin and Edward U. Elam in U.S. patent application Serial No. 79,492, filed on or about December 30, 1960, entitled, "Separation of Cis and Trans Isomers of Tetraalkyl-1,3-Cyclobutane-diols and Novel Compounds Obtained Thereby."

The liquid distillate (i.e., the organic layer from the azeotrope separator) was dried with anhydrous magnesium sulfate, filtered, and distilled through a 1.8 x 25-cm. column filled with 0.16 x 0.16-in. protruded stainless steel packing. Fractions of 2,2,4-trimethyl-3-pentenal, B.P. 81–83.5° (100 mm.), $n_D^{20}$ 1.4357–1.4361, amounted to 218 g.

*Analysis.*—Calculated for $C_8H_{14}O$: C, 76.14; H, 11.18; molecular weight, 126. Found: C, 76.11; H, 11.32; molecular weight, 119; strong absorption at 1735 cm.$^{-1}$ and 2700 cm.$^{-1}$; weak absorption at 1600 cm.$^{-1}$.

In establishing the identity of the 2,2,4-trimethyl-3-pentenal product by nuclear magnetic resonance spectroscopy the NMR spectrum of the product was recorded with a Varian Associates Model V–4300–B high-resolution NMR instrument (40 mc.) equipped with a flux stabilizer. The chemical shift positions were determined relative to water as an external standard. Chemical shift peaks were observed at −160 c.p.s. (—CHO),

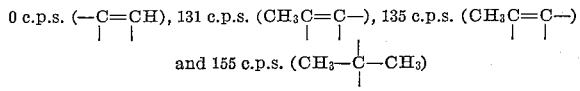

and 155 c.p.s. ($CH_3$—C—$CH_3$)

Spin-Spin peaks (J=1.5 c.p.s.) were observed in the resonance at 0 c.p.s. The resonances at 131 and 135 c.p.s. were each split into doublets by interaction with a single proton (J=1.5 c.p.s.).

Further, to identify the aldehyde as 2,2,4-trimethyl-3-pentenal, the 2,4-dinitrophenylhydrazone was prepared and recrystallized from ethyl alcohol. It melted at 142–143° C.

*Analysis.*—Calculated for $C_{14}H_{18}N_4O_4$: C, 54.89; H, 5.92; N, 18.29. Found: C, 54.82; H, 5.75; N, 17.78.

Identification of the aldehyde product of Example 1 was further established by its catalytic hydrogenation to a known compound as shown in the next example.

*Example 2*

A mixture of the 2,2,4-trimethyl-3-pentenal (66.3 g., 0.526 mole), as obtained in Example 1, with 150 ml. of ethyl alcohol, and 5.0 g. of Raney nickel was heated and shaken in an autoclave at 150° C. under 1000 p.s.i. pressure of hydrogen for seven hours. The mixture was filtered to remove catalysts and the filtrate was distilled through a 1.8 x 18-cm. column packed with $5/16$ in. glass helices. The yield of 2,2,4-trimethyl-1-pentanol was 55.4 g. (81%), B.P. 164–166.5° C., $n_D^{20}$ 1.4292–1.4298. Brannock (J. Am. Chem. Soc., 81, 3379, 1959) reported a B.P. of 166–166.5° C., $n_D^{20}$ 1.4300. The infrared spectrum was identical with that of an authentic sample of 2,2,4-trimethyl-1-pentanol.

Examples 3 and 4 below demonstrate the effect of acid concentration on the stability of the trans and cis isomers, respectively, of 2,2,4,4-tetramethyl-1,3-cyclobutanediol.

*Example 3*

An equimolecular mixture of the cis and trans isomers of 2,2,4,4-tetramethyl-1,3-cyclobutanediol was boiled with aqueous sulfuric acid solutions of increasing concentration. The rate of formation of 2,2,4-trimethyl-3-pentenal was observed by collection of the condensate in a continuous azeotrope separator and the measurement of the amount of organic distillate. No change was noted in the glycol mixture of after being heated in boiling water for 45 hours. A solution of 200 g. of the glycol mixture in 500 ml. of water containing 10 ml. of 0.1 N sulfuric acid was also unchanged after being refluxed for 91 hours. After the addition of 80 ml. more 0.1 N sulfuric acid, further refluxing produced 2.4 g. of impure 2,2,4-trimethyl-3-pentenal in 48 hours. Finally, after addition of 3 ml. of concentrated sulfuric acid in 10 ml. of water, continued refluxing gave 72.3 g. more impure aldehyde in 168 hours.

*Example 4*

The cis isomer of 2,2,4,4-tetramethyl-1,3-cyclobutanediol (77.5 g.) was mixed with 500 ml. of water and 20 ml. of concentrated sulfuric acid, and the solution was refluxed for 271 hours in apparatus equipped with continuous azeotrope separator. No 2,2,4-trimethyl-3-pentenal was formed and apparently no change occurred. An additional 50 ml. of concentrated sulfuric acid was added; again, no aldehyde was formed during 21 hours of refluxing. The mixture was cooled and 180 ml. of concentrated sulfuric acid was added. When heating was resumed, the solid glycol dissolved, the color of the reaction solution rapidly darkened and tar gradually formed. After 41 hours, heating was stopped and a small amount of organic distillant in the azeotrope separator was examined. It was a complex mixture in which no 2,2,4-trimethyl-3-pentenal could be found by distillation.

Separation of the cis isomer of 2,2,4,4-tetramethyl-1,3-cyclobutanediol from a mixture of the cis and trans isomers of the diol is demonstrated in the next example under reaction conditions different than those employed in Example 1.

*Example 5*

A solution of 60 ml. of concentrated sulfuric acid (sp. gr. 1.84) in 1500 ml. of water was mixed with 335.0 g. (2.36 moles) of 2,2,4,4-tetramethyl-1,3-cyclobutanediol (a mixture of cis and trans isomers). The mixture was heated to boiling and the vapors were passed upward through a 12-inch Vigreux column and into a continuous azeotrope separator. The solid glycol dissolved and the reaction mixture became homogeneous; as the reaction progressed, a crystalline solid separated from the solution. The mixture was refluxed 4 days with continuous removal of the organic material which azeotroped. The solid was removed from the hot reaction mixture by filtration. The mother liquor was cooled in ice and the solid which crystallized was removed. The mother liquor was boiled until it reached saturation. Sodium bicarbonate was added to the liquor until the evolution of gas appeared to stop. The mixture was boiled slightly, cooled with ice and the solid which crystallized was separated. The solid product was mixed with the first two batches of solid product, treated with sodium bicarbonate to destroy any residual sulfuric acid, and recrystallized from toluene. The 78.8 g. of product obtained was cis-2,2,4,4-tetramethyl-1,3-cyclobutanediol, M.P. 162.5–163.5° C.

The mother liquor was evaporated to dryness and the solid obtained was extracted with toluene, filtered and cooled with ice. The 22.6 g. of product obtained was cis-2,2,4,4-tetramethyl-1,3-cyclobutanediol, M.P. 162.5–163.5° C.

The total yield of 2,2,4,4-tetramethyl-1,3-cyclobutanediol was 101.4 g. (64% based on an infrared isomer analysis of 47.3% cis.

The foregoing examples show that a mixture of cis and trans isomers of 2,2,4,4 - tetraalkyl - 1,3 - cyclobutanediols may be reacted in accordance with the invention to obtain the pure cis isomer and to dehydrate the trans isomer to the corresponding 2,2,4,4-tetraalkyl-3-butenal. When the sole object is to obtain the cis isomer from a mixture of the cis and trans isomers of the diol, it is unnecessary to collect the aldehyde formed by the dehydration of the trans isomer. My process for the dehydration of the trans isomer of 2,2,4,4-tetraalkyl-1,3-cyclobutanediol to the corresponding aldehyde does not require the presence of the cis isomer; hence, the starting material may be the trans isomer of the glycol where the sole object is the dehydration thereof to the 2,2,4,4-tetraalkyl-3-butenal.

Various mineral acids may be employed in carrying out my invention, the principal requirement being that the acid has a pK of less than 3.4. Sulfuric and phosphoric acids have been found to be quite suitable. Those acids which are strong oxidizing agents are less desirable since they tend to oxidize the diol to the dione, and in some instances will cause other undesirable side reactions.

The concentration of the acid solution may be varied over a wide range. For instance the trans isomer of the diols is slowly converted to the corresponding aldehyde by boiling in sulfuric acid solutions of concentration as low as 0.1 percent, whereas the cis isomer is stable to boiling 50 percent sulfuric acid for short periods of time. For acids of pK less than 3.4 I prefer to use an acid concentration of 3 percent to 20 percent. Acid concentrations of 7 percent are particularly suitable. The concentration of glycol in the acid solution may usefully be varied from 1-75%. I prefer low concentrations to help minimize side reactions.

The solvent for the acid having a pK of less than 3.4 may be water, an organic acid, or an inert solvent such as toluene. Solutions of the acid in alcohols are less desirable where the aldehyde formed by cleavage of the trans isomer of the glycol is to be recovered, because of the possibility of reaction between the aldehyde and the alcohol. Water solutions of the desired acid are eminently satisfactory in carrying out my invention.

Reaction temperatures in the range of about 40 to 250° C. can be used. When the reaction is carried out at the boiling point of the acid solution, removal of the aldehyde as formed becomes simply a matter of steam distillation. At reaction temperatures lower than the boiling point of the acid solution, other arrangements must be made to remove the aldehyde continuously from the reaction zone to prevent further reaction. Reaction temperatures above the boiling point of the acid solution may be advantageous for increasing the rate of operation, but require the use of pressure vessels.

The acid solution may be added to the glycol, or the glycol may be added to the acid solution. When more concentrated acid is used, or when large amounts of material are processed, I prefer to add the glycol slowly to the refluxing acid solution while continuously removing the unsaturated aldehyde. This procedure insures a short contact time between the aldehyde and the acid, and thus minimizes side reactions.

The 2,2,4,4-tetraalkyl-3-butenals prepared in accordance with the present invention have utility as reactive chemical intermediates, the molecule containing both an aldehyde group and an unconjugated double bond. Alcohols derived from the aldehyde by hydrogenation thereof are useful in preparing valuable esters. For example, 2,2,4-trimethyl-3-pentenal may be hydrogenated in good yield to 2,2,4-trimethyl-1-pentanol which is useful in preparing ester lubricants (Brannock, U.S. Patent No. 2,889,-354).

The cis isomer of 2,2,4,4-tetraalkyl-1,3-cyclobutanediol can be used in the preparation of esters and polyesters which have useful properties. Polyesters of superior properties are obtained by using the pure cis isomer of 2,2,4,4-tetramethyl-1,3-cyclobutanediol rather than a mixture of the cis and trans isomers of the glycol for the following reasons. Thus, a polyester prepared from diphenyl terephthalate and the cis isomer has a more narrow melting point range than a corresponding polyester prepared from the cis and trans diol mixture. This is a distinct advantage if melt spinning of the polymer is to be utilized. Furthermore, the terephthalate polymer prepared from the cis isomer is soluble in methylene chloride whereas the polymer formed from a mixture of the cis and trans isomers is not. This is a decided advantage in solvent casting of films. Still further, a film formed from the pure cis-glycol polyester has a higher heat distortion temperature than one formed from a mixture of the cis and trans glycols.

Thus, it may be seen that the present invention provides a method for the dehydration of trans-2,2,4,4-tetraalkyl-1,3-cyclobutanediols to the corresponding aldehydes and a method for the separation of the pure cis isomer of a 2,2,4,4-tetraalkyl-1,3-cyclobutanediol from a mixture of cis and trans isomers of the glycols.

Although the invention has been described in considerable detail with reference to certain preferred embodiments thereof, it will be understood that variations and modifications can be effected within the spirit and scope of the invention as described hereinabove and as defined in the appended claims.

I claim:
1. The process which comprises heating a trans-2,2,4,4-tetraalkyl-1,3-cyclobutanediol in an aqueous solution of an acid selected from the group consisting of sulfuric and phosphoric acid of 3 to 20 percent concentration at the boiling point of the reaction mixture and separating the resulting 2,2,4,4-tetraalkyl-3-butenal.

2. The process which comprises mixing a trans-2,2,4,4-tetramethyl-1,3-cyclobutanediol with an approximately 7 percent aqueous solution of sulfuric acid, heating the mixture to the boiling point thereof and recovering 2,2,4-trimethyl-3-pentenal as product.

3. The process which comprises heating a mixture of the cis and trans isomers of a 2,2,4,4-tetraalkyl-1,3-cyclobutanediol with a 3 to 20 percent aqueous solution of sulfuric acid at the boiling point of the solution, and recovering the unconverted cis isomer from the mixture.

4. The process for separating the cis isomer from a mixture of cis and trans isomers of 2,2,4,4-tetramethyl-1,3-cyclobutanediol which comprises dissolving said mixture in a 3 to 20% aqueous solution of sulfuric acid, boiling the solution until volatile organic material no longer evolves and recovering unconverted purified cis-2,2,4,4-tetramethyl-1,3-cyclobutanediol as a precipitate from the reaction solution.

5. The process for separating the cis isomer from a mixture of cis and trans isomers of 2,2,4,4-tetramethyl-1,3-cyclobutanediol and for producing 2,2,4-trimethyl-1-pentenal from the trans isomer which comprises dissolving said mixture in a 3 to 20% aqueous solution of sulfuric acid, boiling the solution until volatile organic material no longer evolves, collecting the vapors which evolve and recovering 2,2,4-trimethyl-1-pentenal therefrom, recovering unconverted purified cis-2,2,4,4-tetramethyl-1,3-cyclobutanediol as a precipitate from the reaction solution, making the reaction solution basic and recovering additional unconverted cis isomer as precipitate.

References Cited by the Examiner

Allen et al., Jour. Chem. Soc. (1959), pp. 2186–2192.

LEON ZITVER, *Primary Examiner.*

CHARLES B. PARKER, *Examiner.*

J. J. SETELIK, B. HELFIN, *Assistant Examiners.*